Aug. 22, 1933.  F. G. FRENGER  1,923,364
AUTO OILING DEVICE
Original Filed Aug. 27, 1925
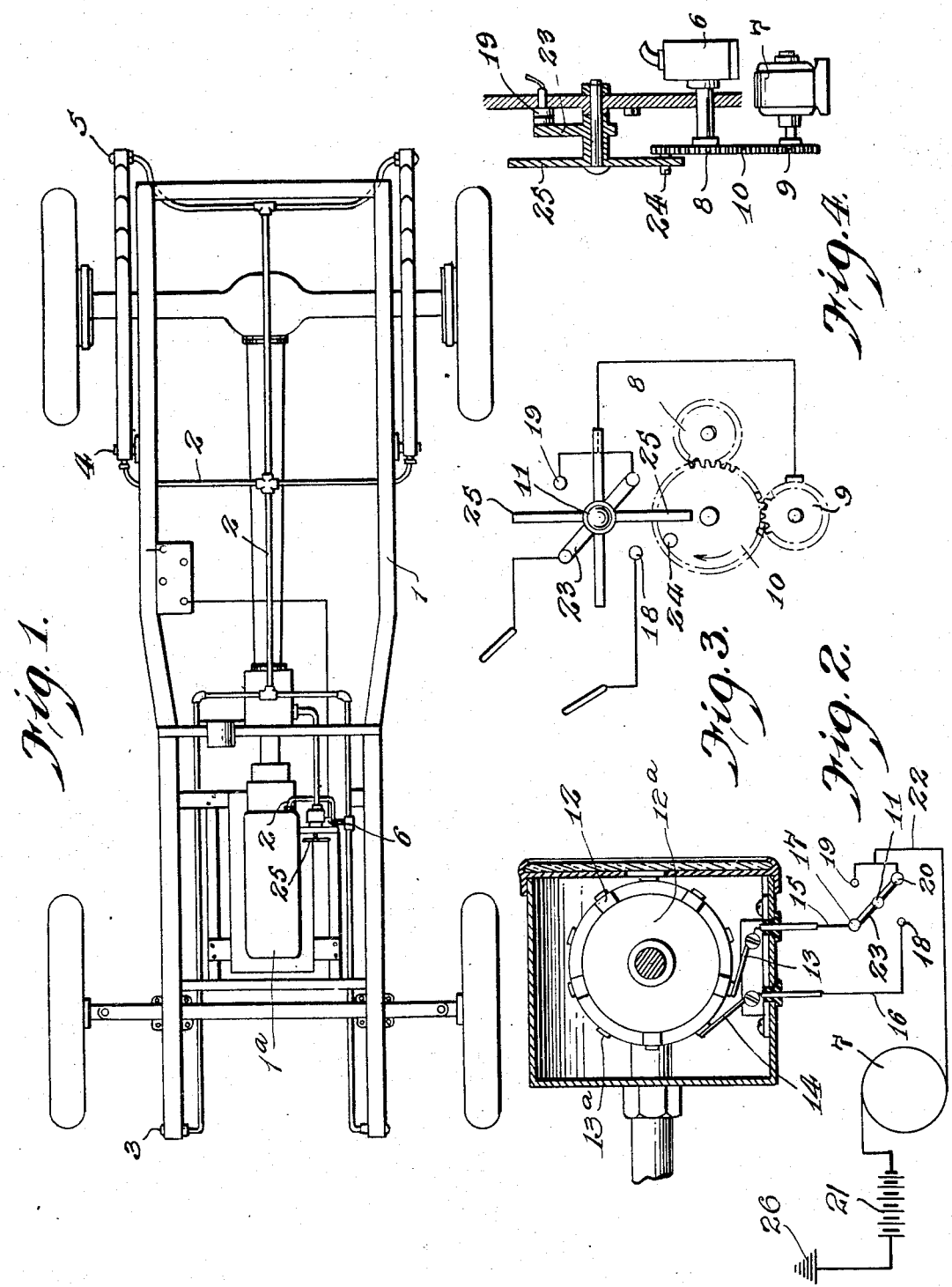
WITNESS
INVENTOR
F. G. Frenger,
BY
ATTORNEYS Patented Aug. 22, 1933

1,923,364

UNITED STATES PATENT OFFICE 1,923,364

AUTO OILING DEVICE

Frank George Frenger, New York, N. Y., assignor, by mesne assignments, to The Lubrication Corporation, South Bend, Ind., a Corporation of Delaware Application August 27, 1925, Serial No. 52,865
Renewed March 26, 1930

16 Claims. (Cl. 184—70)

This invention relates to automatic lubrication systems for auto vehicles and particularly to systems of that type in which lubricant is periodically supplied simultaneously to a plurality of points on the chassis of the auto vehicle, responsively to a rotating element of the mechanism of the auto-vehicle, such as the engine shaft, or preferably some part which rotates in unison with the vehicle wheels. In the present illustrative embodiment of the invention, I have chosen one of the revolution counters of the speedometer as the controlling element of the operation of the lubrication system.

The object of the present invention is to provide a novel lubricating system including means for supplying lubricant at periods whose frequency is dependent on the automobile mileage. The invention has for further objects other improvements.

The object of the present invention is to provide an electric motor for operating the oil pump in a lubrication system of the type indicated, intercalated in parallel circuits alternately energized by a periodic switch operating synchronously with a moving part of the mechanism of the auto vehicle, there being a safety switch in said circuits automatically operated by the motor for deenergizing that circuit which may at the time be energized, should the contacts of the periodic switch remain closed when the auto vehicle is stopped, thereby preventing continuous operation of the motor and running down of the battery by which the motor is operated.

Other objects of the invention will appear as the following description of a preferred embodiment thereof proceeds.

In the drawing:

Figure 1 is a plan view of the chassis of an auto vehicle to which the device of my invention is applied showing a system of piping for lubricant, leading from the crank case of the internal combustion engine of the auto vehicle to the several points of the chassis to which the lubricant is to be supplied.

Figure 2 is a diagrammatic view of the circuits and electrical devices included in my invention, showing a section through the speedometer, exposing one of the revolution counters.

Figures 3 and 4 are respectively front elevational and side sectional views showing the geared assembly of motor, pump and safety switch.

Referring now in detail to the several figures, the chassis frame which is denoted by the numeral 1, carries an internal combustion engine 1a having a crank case from which a piping system 2 leads to various points of the chassis which are to be lubricated, such as, for instance, the bearing surfaces at the ends 3, 4, 5 of the vehicle springs. It is to be understood that the crank case has been chosen as a reservoir for the lubricant, simply because of its convenience, but that another separate reservoir may be provided, if desired.

A pump 6 is incorporated in the lubrication system for delivering oil under pressure to the terminal orifices of the piping. Said pump is preferably driven by an electric motor through a train of gearing including gears 8 and 9 on the pump and motor shafts respectively, and an intermediate gear 10 of relatively larger size which has the dual function of operating a safety switch 11 in a manner which will presently be described, and of reducing the speed ratio between the motor and the pump.

The motor 7 is periodically operated by means of a periodic switch which moves responsively to some rotating element such as an engine gear or shaft, or a member rotating in unison with a propeller shaft connected with a vehicle wheel of the chassis. In the present instance I have selected the revolutions counting wheel 12a of the speedometer, which records the miles by hundreds. This wheel, as is well known, records an additional one hundred miles for each angular rotation of one tenth of a complete revolution. This wheel is converted into the drum element of a periodic switch by arranging grounded contacts 12, there around at intervals of one fifth revolution.

Brushes 13 and 14 are arranged in operative relation to said drum at an arcuate distance apart equal to one tenth the circumference of said drum, so that when one brush engages one of the contacts 12, the other brush touches the non-conductive surface 13a of said drum at a point halfway between the contact engaged by the brush 13, and the adjacent contact. Circuit wires 15 and 16 lead from the brushes to the poles 17 and 18 of the safety switch 11. The opposite poles 19 and 20 of said safety switch are in circuit with the motor 7, battery 21 and ground 26 by means of the circuit wire 22.

The safety switch has a pivotal arm 23 which is adapted alternately to establish continuity between the wires 15 and 16 and the wire 22 placing the motor alternately in the circuits of the brushes 13 and 14. Said arm is of the snap type so when it is out of engagement with one contact it immediately snaps into engagement with an adjacent contact without resting inadvertently in an intermediate position.

It is apparent from an inspection of Figure 2 that with the brush 13 and arm 23 in the positions shown, a circuit will be completed through the motor, operating the latter and causing the pump to be actuated. Meanwhile the brush 14 is in open circuit position, and there is also a gap between the poles 18 and 19 of the safety switch.

The intermediate gear 10 is provided with a pin 24, engageable with arms 25 which extend at right angles to each other radially of the axis of the switch arm 23, and movable therewith. When an arm 25 is struck by the pin 24, referring now to Fig. 3 the switch arm 23 snaps over to close the gap between the poles 18 and 19. Both circuits are now open and the motor ceases to operate. The circuits remain open until the chassis travels the next hundred miles when the adjacent contact 12 comes into engagement with the brush 14, closing the circuit through the brush 14, poles 18 and 19, motor and battery, again operating the motor and actuating the pump. Lubrication is thus supplied to the system under pressure at intervals of one hundred miles.

The safety switch 11 functions to prevent running down of the battery should the vehicle come to a rest with one of the brushes in engagement with one of the grounded contacts. For example, should the vehicle come to a standstill with the brush 13 in touch with one of the contacts 12, the motor will run only until the pin 24 on the gear 10 kicks the switch arm 23 over to the poles 18 and 19 which are in a circuit already open at the brush 14.

It is to be understood that equivalent instrumentalities may be substituted for the speedometer, safety switch and lubrication system herein depicted and described, and that the adaptations of the invention to various structures and arrangements is limited only by the express terms of the claims.

I claim:—

1. An automatic lubricating system for vehicles, comprising lubricant supply means, electrical means for operating said supply means, and two parallel-connected circuit branches including means for controlling said electrical means, said controlling means comprising a contacting device moved in accordance with the distance travelled by the vehicle, two fixed contact members respectively connected in said circuit branches and arranged to make contact alternately with said contacting device, and a limit switch actuated by said electrical means to transfer the circuit connection for said electrical means from either one of said circuit branches to the other after a predetermined cycle of operation of said electrical means.

2. An automatic lubricating system for vehicles, comprising lubricant supply means, electrical means for operating said supply means, and two parallel-connected circuit branches including means for controlling said electrical means, said controlling means comprising an element moved in accordance with the distance travelled by the vehicle, a plurality of electrically connected spaced contact members carried by said element, two fixed contact members spaced apart substantially one-half the distance by which said first-mentioned contact members are spaced and engageable with said first-mentioned contact members to complete a circuit connection respectively to said two parallel-connected circuit branches alternately after predetermined distances of travel of the vehicle, and a limit switch actuated by said electrical means to transfer the circuit connection for said electrical means for either one of said circuit branches to the other after a predetermined cycle of operation of said electrical means.

3. An automatic lubricating system for auto vehicles comprising a pump, an electric motor for driving said pump, said motor being in alternately energized circuits, and an intermittently operated switch operating responsively to a distance controlled element of said auto vehicle for alternately making said circuits effective to actuate said motor.

4. An automatic lubricating system for auto vehicles comprising a pump, an electric motor for driving said pump, a pair of circuits in which said motor is intercalated, an intermittently operated switch operating responsively to a distance controlled element of said auto vehicle for alternately closing said circuits to permit energization of said motor, said circuits being formed with gaps, and means actuated by said motor for always closing the gap in one or the other of said circuits prior to the closure of that circuit by the said switch.

5. An automatic lubricating system for auto vehicles comprising a pump, an electric motor for driving said pump, a pair of circuits in which said motor is intercalated, an intermittently operated switch operating responsively to a distance-controlled element of said auto vehicle for alternately closing said circuits to permit energization of said motor, said circuits having gaps, means for always closing the gap in one or the other of said circuits, and means actuated by said motor when energized from one circuit for throwing said gap-closing means to gap open position with respect to said circuit, and to gap closing position with respect to the other of said circuits.

6. An automobile chassis lubricating system comprising a lubricant reservoir, a distance-controlled, electrically-operated, automatic means for supplying predetermined quantities of lubricant to the chassis parts, and means independent of said distance controlled means for automatically stopping the operation of said lubricant supply means when the automobile is not in motion.

7. An automobile chassis lubricating system comprising a lubricant reservoir, a distance-controlled, electrically operated, automatic means effective intermittently for supplying lubricant to the chassis parts, and means for automatically stopping the operation of said lubricant supply means after a predetermined quantity of lubricant is supplied to the chassis parts when the automobile is a rest.

8. An automobile chassis lubricating system comprising a pump, an electric motor for driving said pump, a distance responsive mechanism for intermittently making said motor effective, and a safety switch for automatically making said motor ineffective when same is operating while the automobile is at rest.

9. An automatic lubricating system for automobile vehicles, comprising a pump, an electric motor for intermittently driving said pump, a pair of electric circuits in both of which said motor is interposed, switch means for alternately completing each of said circuits, and means responsive to the travel of said automobile vehicle for predetermined distances for operating said switch means to close gaps in said circuits alternately to actuate the motor.

10. In an automobile chassis lubricating system, a lubricant reservoir, means for supplying predetermined quantities of lubricant to the chassis parts from said reservoir comprising an electrically operated automatic mechanism controlled by the travel of said automobile for a predetermined distance, and means effective when the automobile is not in motion for automatically stopping the operation of said lubricant supply means.

11. An automobile chassis lubricating system, comprising a lubricant pump, an electric motor effective intermittently for driving said pump, mechanism responsive to distance travelled by said automobile for intermittently making said electric motor effective, and means comprising a safety switch automatically operative to stop said motor when it is operating while the automobile is at rest.

12. An automobile chassis lubricating system comprising a lubricant pump, means for driving said pump, mechanism responsive to distance traveled by said automobile for intermittently making said driving means effective, and safety means for stopping said driving means when it is operating while the automobile is not traveling.

13. An automatic central lubricating system for a machine comprising, lubricant forcing means, an electric motor for operating said forcing means, said motor being in a plurality of energizable circuits, means for switching from one of said circuits to another, and means responsive to movement of a part of the machine for operating said switching means.

14. An automatic central lubricating system for a machine comprising, lubricant forcing means, an electric motor for operating said forcing means, said motor being in a plurality of energizable circuits, means for switching from one of said circuits to another, and means responsive to a predetermined operation of said forcing means for operating said switching means.

15. A central lubricating system for a machine including an element having cyclic movement when said machine is in operation, comprising a source of lubricant supply, a lubricant pump for supplying lubricant from said source to a bearing of said machine, means for driving said pump, a source of energy for said driving means independent of the operation of said machine, said driving means being energized from said source by said machine element at a point in the cycle of its movement to initiate movement of said pump to supply lubricant to the bearing, continued operation of said driving means being independent of the operation of said machine, and means for stopping said driving means after a predetermined time interval.

16. A central lubricating system for a machine including an element having cyclic movement when said machine is in operation, comprising a source of lubricant supply, a lubricant pump for supplying lubricant from said source to a bearing of said machine, means for driving said pump, a source of energy for said driving means independent of the operation of said machine, said driving means being energized from said source by said machine element at a point in the cycle of its movement to initiate movement of said pump to supply lubricant to the bearing, continued operation of said driving means being independent of the operation of said machine, and means for stopping said driving means after a predetermined amount of lubricant has been delivered by said pump.

FRANK GEORGE FRENGER.